（12） United States Patent
Jahn et al.

(10) Patent No.: US 6,558,491 B2
(45) Date of Patent: May 6, 2003

(54) APPARATUS FOR ULTRASONIC WELDING

(75) Inventors: Ray Jahn, Dearborn, MI (US); Oludele Olusegun Popoola, Novi, MI (US); Larry Van Reatherford, Clarkston, MI (US); Ronald Paul Cooper, Eastpointe, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 208 days.

(21) Appl. No.: 09/757,183

(22) Filed: Jan. 9, 2001

(65) Prior Publication Data

US 2002/0088525 A1 Jul. 11, 2002

(51) Int. Cl.[7] .............................................. B29C 65/08
(52) U.S. Cl. ...................... 156/73.1; 156/289; 156/537; 156/580.1
(58) Field of Search ................................. 156/73.1, 289, 156/537, 580.1, 580.2

(56) References Cited

U.S. PATENT DOCUMENTS

| 4,313,781 | A | * | 2/1982 | Rovigo ....................... 156/530 |
| 4,954,206 | A | * | 9/1990 | Voss ........................... 156/537 |
| 5,435,878 | A | * | 7/1995 | Delmar et al. ........... 156/272.2 |
| 5,865,941 | A | * | 2/1999 | Focke et al. ................ 156/443 |
| 6,120,629 | A | * | 9/2000 | Shannon et al. .......... 156/73.1 |

* cited by examiner

Primary Examiner—James Sells
(74) Attorney, Agent, or Firm—Danian Porcari

(57) ABSTRACT

An ultrasonic welder 10 for providing improved surface finish on weldable material, including an anvil 22 and a fabric element 30 positioned between the anvil 22 and the weldable material 24 thereby protecting the surface finish on the weldable material 24.

15 Claims, 1 Drawing Sheet

APPARATUS FOR ULTRASONIC WELDING

TECHNICAL FIELD

The present invention relates generally to an apparatus for ultrasonic welding and, more particularly, to an apparatus for ultrasonic welding with improved surface finish characteristics.

BACKGROUND

Ultrasonic welding is well-known in the prior art. During ultrasonic welding, materials are welded together by moving the end of an ultrasonic horn against the material with the frequency that lies in the ultrasonic range. The surface oxide and contaminants are disintegrated and dispelled, and a strong metallic bond is formed. A wide variety of types and configurations of ultrasonic welders are known.

Ultrasonic welding has proved highly beneficial in welding a variety of materials, including light weight materials such as aluminum and magnesium. Conventional fusion-based welding technologies potentially present problems such as dimensional instability, surface finish and heat affected zones when applied to such alternate materials. Although some of these problems can be alleviated using post-welding craftsmanship, the time and cost involved in such repair procedures further underlies the value of ultrasonic welding.

Present ultrasonic welders, as well as conventional fusion based welding, have difficulty achieving class-A surface finishes. Often, in ultrasonic welders, both the sonotrode tip and the anvil of ultrasonic welders are knurled to improved the gripping of material. The knurl pattern leads to imprints on the surface of welded articles. This can be highly undesirable when an unaffected surface appearance of the material is desired, as is often the case in automotive body welding. It is known that this imprint may be reduced through the use of smooth surface tips and anvils. The use of these smooth surfaces, however, often requires a higher clamping pressure during welding to compensate for the reduction of material gripping. This increase in clamping pressure results in indentation at the weld area, which again can lead to a negative surface appearance of the material.

It would, therefore, be highly desirable to have a method of welding that reduces the negative effects on surface finish characteristics of the material it welds.

SUMMARY OF THE INVENTION

It is, therefore, an object of the present invention to provide an ultrasonic welder that provides improved surface finish characteristics on weldable material.

In accordance with the object of this invention, an ultrasonic welder is provided. The ultrasonic welder includes an anvil. A fabric element is positioned between the anvil and the weldable material. The fabric element improves the surface finish characteristics of the weldable material contacting the anvil.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
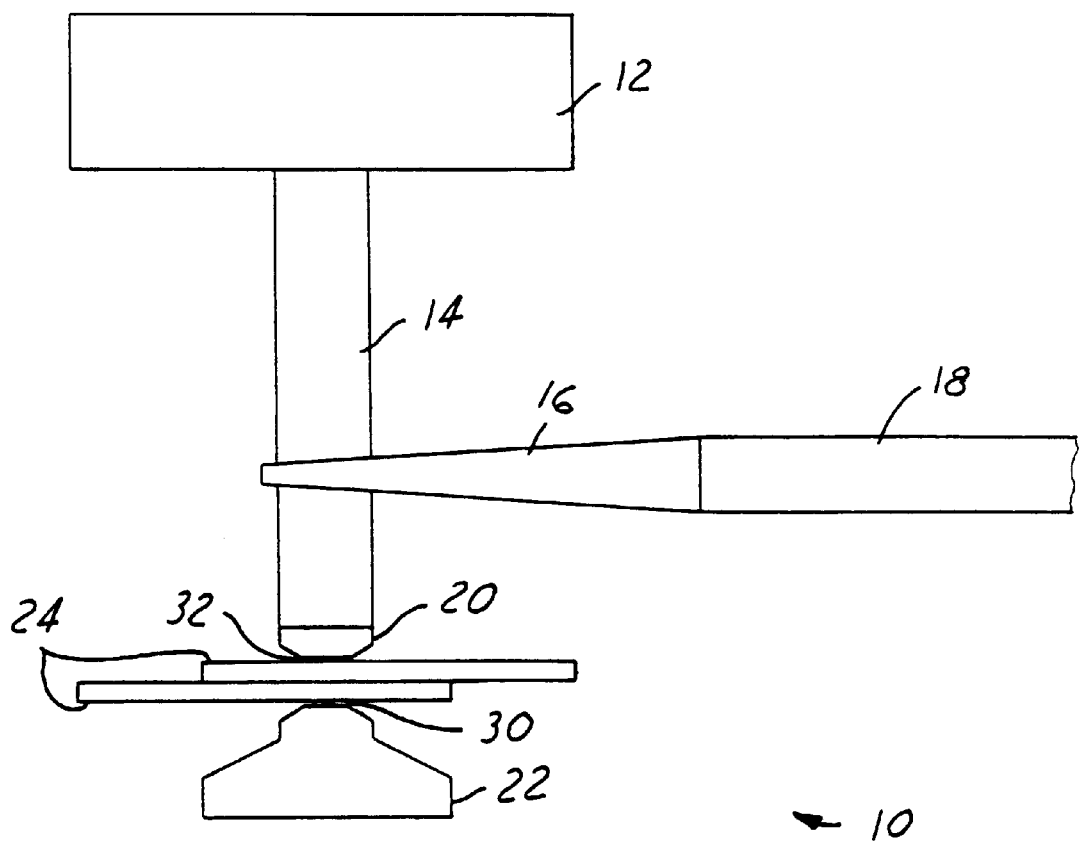
FIG. 1 is an illustration of an embodiment of an ultrasonic welder in accordance with the present invention.

Referring now to FIG. 1, which is an illustration of an embodiment of an ultrasonic welder 10 in accordance with the present invention. The ultrasonic welder 10 is preferably for use in sheet metal welding applications. However, the ultrasonic welder 10 may be used in a variety of other welding applications, including non-sheet metal welding applications.

The ultrasonic welder 10, based on a wedge-reed design, shown in FIG. 1 is for illustrative purposes only and is not intended to create limitations on the present invention. A variety of designs and configurations for ultrasonic welders, such as lateral drive welders, are well-known in the prior art and are contemplated by this invention. The ultrasonic welder 10 includes a clamp element 12, a reed element 14, a wedge element 16, a transducer 18, a sonotrode tip 20, and an anvil 22. Welding is accomplished by applying a clamping force onto weldable material 24 positioned between the sonotrode tip 20 and the anvil 22. An oscillating force is applied to the weldable material 24 through the sonotrode tip 20. The combination of clamping and oscillation forces are used to create a weld in the weldable material 24. This method of ultrasonic welding has proven highly successful in welding light weight materials, such as aluminum, and for welding dissimilar material, such as aluminum and magnesium together.

Although several materials have been listed, it should be understood that ultrasonic welding is proven to be highly practical with a variety of materials and under a variety of conditions. The prior art, however, often has had problems due to damage of the surface finish of the weldable material caused by the anvil 22 or the sonotrode tip 20.

The present invention further includes fabric element 30. In one embodiment, the fabric element 30 is positioned between the anvil 22 and the weldable material 24. The fabric element 30 helps protect the surface finish of the weldable material 24 during the ultrasonic welding process. A fabric may consist of a variety of well-known materials. It is preferable that the fabric element 30 be comprised of heat resistant fabric. Fabric such as Nomex, Kevlar, Polybenzoimid, Zylon, Tehnora, and Basofil work well in the present invention, although a wide variety of materials are contemplated. The heat resistance, strength, and weave pattern of the fabric element 30 can all be varied to optimize the surface finish in the wide variety of ultrasonic welding scenarios.

Each of such properties of the fabric element 30 can be altered to produce varying results. The heat resistance of the fabric element 30 must withstand the portion of the ultrasound energy that is converted into heat. The stiffness of the fabric element 30 should not modify significantly the transmission of the ultrasonic wave, by way of dampening out the wave. The compliance of the fabric element 30 is significant since it determines how the contact pressure is distributed and thereby directly affects surface finish. A potential fabric element 30 can be evaluated by determining these, as well as other, characteristics. Typically, an optimal compromise between stiffness (better transmission of ultrasonic wave) and compliance (better distribution of pressure) is achieved by weaving control. The weaving control can vary characteristics such as strand tension, strand size, spacing and pattern. Although the aforementioned fabrics can be used with the present invention, new fabrics may be evaluated and formulated using the listed characteristics.

Although many of the welding scenarios only require surface finish of the weldable material to be protected on a single side of the material, in other scenarios it may be desirable for surface finish to be protected on both sides. Therefore, in an alternate embodiment, a secondary fabric element 32 may be positioned between the sonotrode tip 20 and the weldable material 24.

In still further embodiments, only the secondary fabric element 32, positioned between the sonotrop tip 20 and the weldable material 24, may be used and the fabric element 30 may be omitted if only the surface finish of the weldable material 24 is exposed to the sonotrop tip 20 needs to be protected.

In one embodiment, the fabric element 30 can be physically attached to the anvil 22. In another embodiment, the fabric element 32 may be a separate component detachable from the anvil 22. In still another embodiment, the fabric element 32 may simply be a large sheet of material placed over the anvil 22 prior to welding. In a similar fashion, if the secondary fabric element 32 is positioned between a sonotrop tip 20 and the weldable material 24, the secondary fabric element 32 may also be fixed, mounted, or simply placed between the sonotrop tip 20 and the weldable material 24.

While particular embodiments of the invention have been shown and described, numerous variations and alternate embodiments will occur to those skilled in the art. Accordingly, it is intended that the invention be limited only in terms of the appended claims.

What is claimed is:

1. An ultrasonic welder for providing improved surface finish on weldable material comprising:
   an anvil; and
   a fabric element positioned between said anvil and the weldable material whereby said fabric element distributes pressure created by said anvil so as to improve the surface finish.

2. An ultrasonic welder as described in claim 1 wherein said fabric element is comprised of heat resistant fabric.

3. An ultrasonic welder as described in claim 1 for use in welding aluminum.

4. An ultrasonic welder as described in claim 1 for welding aluminum to magnesium.

5. An ultrasonic welder as described in claim 1 further comprising:
   a sonotrode tip; and
   a second fabric element, said second fabric element positioned between said sonotrode tip and the weldable material.

6. An ultrasonic welder providing improved surface finish on weldable material comprising:
   a sonotrode tip; and
   a fabric element positioned between said sonotrode tip and the weldable material whereby said fabric element distributes pressure created by said sonotrobe tip so as to improve the surface finish.

7. An ultrasonic welder as described in claim 6 wherein said fabric element is comprised of heat resistant fabric.

8. An ultrasonic welder as described in claim 6 for use in welding aluminum.

9. An ultrasonic welder as described in claim 6 for use in welding aluminum to magnesium.

10. An ultrasonic welder as described in claim 8 further comprising:
    an anvil; and
    a secondary fabric element positioned between said Anvil and the weldable material.

11. A method of improving the surface finish characteristics of lightweight metal materials welded using an ultrasonic welder including an anvil comprising:
    placing a fabric element between the anvil and the lightweight metal material.

12. A method of ultrasonic welding comprising:
    placing a first metal element and a second metal element between an anvil and a sonotrode;
    placing a fabric element between said first medal element and said anvil;
    applying a clamping force between said anvil and said sonotrode;
    applying an oscillating force to said second metal element and said first metal element using said sonotrode;
    wherein a weld is created between said first metal element and said second metal element, said fabric element protecting a surface finish of said first metal element from damage by said anvil.

13. A method as described in claim 12, further comprising:
    adjusting a strand tension of said fabric element in order to improve said surface finish.

14. A method as described in claim 12, further comprising:
    adjusting a strand pattern of said fabric element in order to improve said surface finish.

15. A method of ultrasonic welding comprising:
    placing a first metal element and a second metal element between an anvil and a sonotrode;
    placing a fabric element between said second metal element and said sonotrode;
    applying a clamping force between said anvil and said sonotrode;
    applying an oscillating force to said first metal element and said second metal element using said sonotrode;
    wherein a weld is created between said first metal element and said second metal element, said fabric element protecting a surface finish of said second metal element from damage by said sonotrode.

* * * * *